(12) United States Patent
Hawie

(10) Patent No.: US 6,561,471 B1
(45) Date of Patent: May 13, 2003

(54) ROD HOLDER AND BRACKET THEREFOR

(76) Inventor: Robert L. Hawie, 73 River St., Bridgeport, CT (US) 06604

( * ) Notice: Subject to any disclaimer, the term of this patent is extended or adjusted under 35 U.S.C. 154(b) by 0 days.

(21) Appl. No.: 09/930,017

(22) Filed: Aug. 15, 2001

(51) Int. Cl.[7] ............................................. F16M 11/00
(52) U.S. Cl. ................... 248/201; 248/316.5; 248/74.1; 43/21.2; 211/60.1
(58) Field of Search .............................. 248/538, 316.5, 248/74.4, 62, 63, 74.1, 201; 24/461, 520, 437; 43/21.2; 211/60.1

(56) References Cited

U.S. PATENT DOCUMENTS

| 3,643,811 | A | | 2/1972 | Howerton |
| 3,672,513 | A | | 6/1972 | Riddle et al. |
| 3,995,742 | A | | 12/1976 | Austin et al. |
| 4,006,825 | A | | 2/1977 | Austin et al. |
| 4,109,796 | A | | 8/1978 | Mitchell |
| 4,132,381 | A | | 1/1979 | McClellan |
| 4,170,801 | A | | 10/1979 | Ward |
| 4,478,381 | A | * | 10/1984 | Pittion .......................... 248/71 |
| 4,586,688 | A | | 5/1986 | Hartman et al. |
| 4,856,221 | A | * | 8/1989 | Thompson |
| 4,897,952 | A | * | 2/1990 | Hawie ......................... 43/21.2 |
| 4,986,504 | A | | 1/1991 | Gary |
| 5,305,978 | A | * | 4/1994 | Current |
| D414,404 | S | * | 9/1999 | van de Lande |
| 6,370,810 | B1 | * | 4/2002 | Widerman ................... 43/21.2 |

* cited by examiner

Primary Examiner—Alvin Chin-Shue
(74) Attorney, Agent, or Firm—Fattibene & Fattibene; Paul A. Fattibene; Arthur T. Fattibene

(57) ABSTRACT

A rod hanger which includes a pair of similarly constructed brackets, each having a mounting plate and a connected generally C-shaped portion connected thereto defining an opening and a complementary latch pivotally connected to one end of the fixed portion to swing between open and closed position. The latch includes a pair of flexible arms provided with opposed outwardly extending flanges and a catch detent formed at the free ends thereof whereby the flanges are arranged to engage in complementary grooves formed in the other end of the C-shaped portion, and the catch detent engaging a transversely extending lip so as to prohibit any unintentional unlatching of the latch. The arrangement is such that the latch is rendered self-locking in the closed position, and rendered readily releasable upon the application of a positive squeezing force on the flexible arms. A resilient liner or cushion secured to the inner surface of the brackets maintains the alignment and protection of a rod, e.g. a fishing rod, supported therebetween from damage.

3 Claims, 3 Drawing Sheets

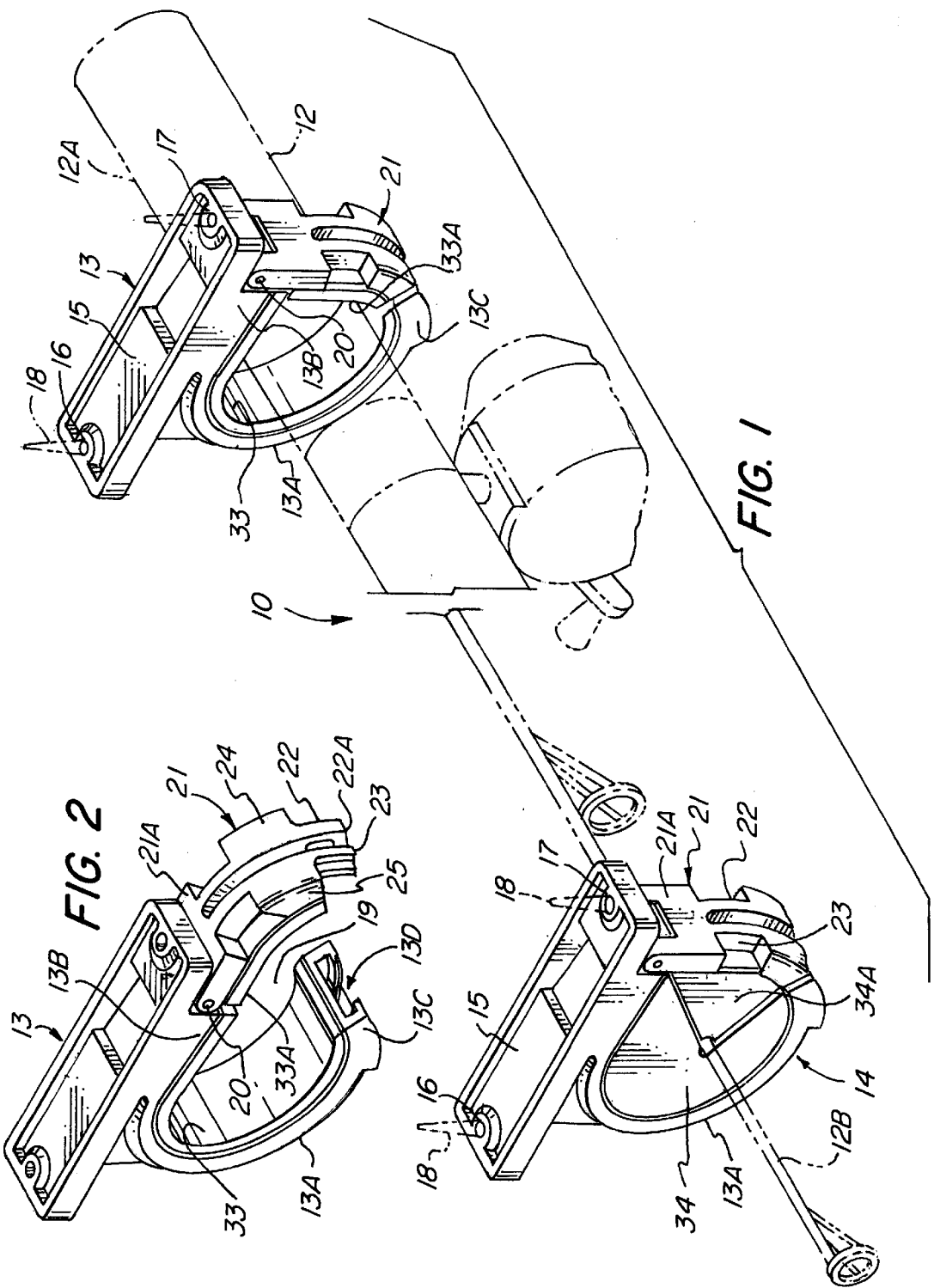

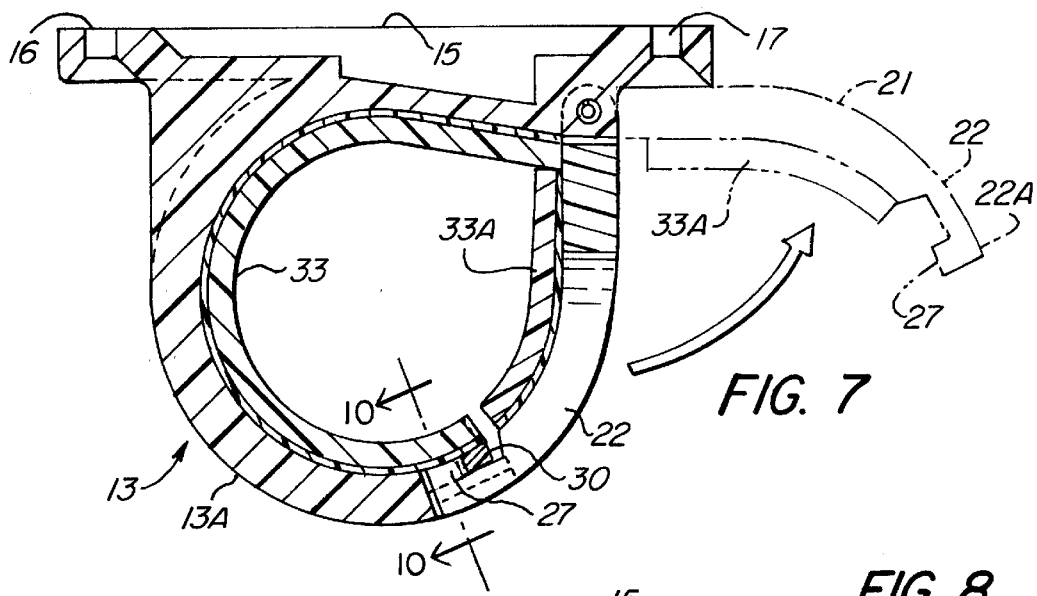
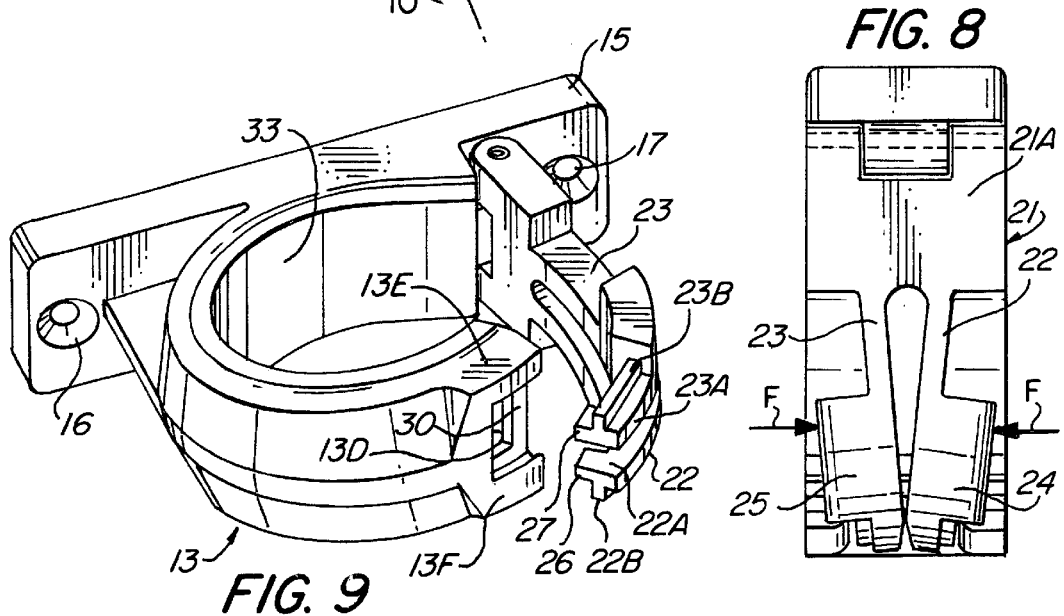
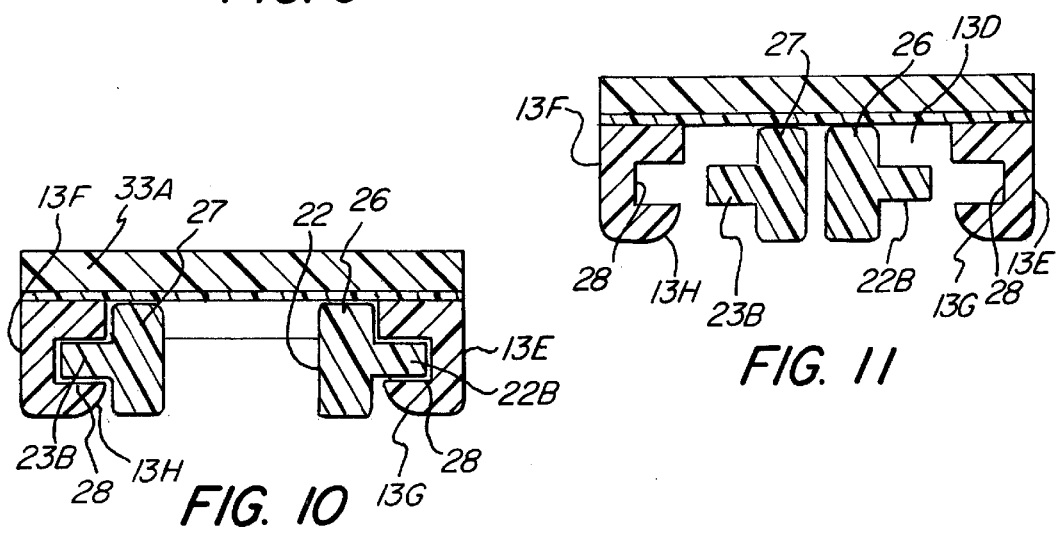

ROD HOLDER AND BRACKET THEREFOR

FIELD OF THE INVENTION

This invention relates to a rod holder or support, and more specifically to a rod holder comprising a pair of spaced apart brackets, each having a releasable and self-locking latch that is positively locked in the latched position for releasably holding and positively securing a rod therebetween.

BACKGROUND OF THE INVENTION

A wide variety of rod holders are known. Heretofore, the known rod holders, and particularly those for supporting a fishing rod, were commonly designed or constructed so that the handle portion of a fishing rod was supported or received in one bracket and the other end of the rod supported in a complementary bracket. The respective brackets included a latch shiftable between an open or closed position. Examples of such supports are illustrated in U.S. Pat. Nos. 3,672,513; 4,006,825 and 4,109,796.

Other known examples of rod holders are disclosed in U.S. Pat. Nos. 4,986,504; 4,586,688; 4,170,801; 4,132,381; 3,995,742 and 3,643,811. However, the known rod holders or supports, while capable of supporting a fishing rod, are relatively complex in structure and sometimes difficult to manufacture which rendered them uneconomical to market.

Reference is also made to my prior issued U.S. Pat. No. 4,879,952, which is incorporated herein by reference. This patent discloses a pair of spaced apart cylindrical or circular shaped brackets, each having a latch pivoting between open and closed position. The present invention constitutes an improvement thereover.

SUMMARY OF THE INVNETION

An object of this invention is to provide a rod hanger formed as a pair of generally similarly constructed brackets, each having a releasable latch mechanism for positively gripping and locking thereto a rod supported therebetween.

Another object is to provide a fishing rod hanger formed of a pair of cylindrically shaped brackets having a portion thereof defining a pivoting latch for swinging between an open and closed position whereby the latch is positively latched in the closed position, and which is rendered readily releasable.

Another object is to provide a rod hanger formed of a pair of spaced apart brackets, each having a pivoting latch to pivot between open and closed position whereby the latch is self-locking Another object resides in a rod hanger formed of a pair of spaced apart and generally circular shaped brackets that include as a portion thereof a pivoting latch having a pair of flexible latching arms for engaging in positive locking engagement with a complementary end of its corresponding brackets.

Another object is to provide a rod hanger formed of a pair of spaced apart brackets having a resilient liner or cushion for securing and centering the supported ends of a fishing rod relative to the respective brackets.

The foregoing objects and other features and advantages are attained by a rod hanger formed of a pair of spaced apart cooperating brackets, each having a mounting base by which the respective brackets may be secured to the supporting surface, e.g. a wall, ceiling, or other suitable supporting surface. Each of the respective brackets are generally circular in shape and include a fixed portion that is generally C-shaped to define an opening and a complementary arcuate shaped latch. The latch is pivotally connected to one end of the fixed C-shaped portion to pivot between an open and closed position and includes a pair of arcuate shaped spaced apart flexible arms adapted to engage a slotted opening formed in the other end of the fixed C-shaped portion. The respective flexible arms include a laterally outwardly extending flange arranged to mate with complementary grooves formed in the slotted opening of the fixed C-shaped portion. Connected to the free end of the respective arms is a catch or detent extending substantially normal relative to its corresponding flexible arm to engage a lip extending transversely between the opposed edges of the slotted opening. In the latched position, the detent or catch engaging the transverse lip in conjunction with the interengagement of the laterally extending flanges within complementary grooves formed in the receiving end of the fixed portion positively secures or locks the latch in the closed position until such time that the flexible fingers are pressed together or squeezed by the application of a positive force. If desired, the internal surfaces of the respective brackets may be lined with a resilient liner or cushion to render a fishing rod supported therebetween immobile to prevent any damage thereto.

Other features and advantages will be rendered apparent when considered in view of the drawings and following description.

IN THE DRAWINGS

FIG. 1 is a perspective view of a rod hanger embodying the invention.

FIG. 2 is a detail perspective view of a bracket forming the rod hanger of FIG. 1, illustrated in the opened position.

FIG. 7 is a section view taken along line 7—7 on FIG. 5.

FIG. 8 is an end view of the bracket illustrating a squeezing force applied to the latch to effect disengagement thereof.

FIG. 9 is a perspective view of the bracket illustrating the pivoting of the latch toward the closed position.

FIG. 10 is a sectional view taken along line 10—10 on FIG. 7.

FIG. 11 is a sectional view taken along line 10—10 on FIG. 7 showing the latch in a disengaging position.

DETAILED DESCRPTION

Referring to FIG. 1, there is shown therein a rod hanger 10 embodying the present invention, which is adapted to be attached to any suitable supporting surface (not shown). It will be understood that the rod hanger 10 may be adapted to support varying kinds of rods, e.g. curtain rods, drapery rods, fishing rods and the like. For purposes of description, the rod hanger 10 will be described with reference to a fishing rod 12, shown in phantom in FIG. 1. As it will be apparent, the rod hanger 10 may be supported on any suitable surface, e.g. a wall, ceiling, gunwale of a boat, railing or any other suitable supporting surface.

Figure 6:
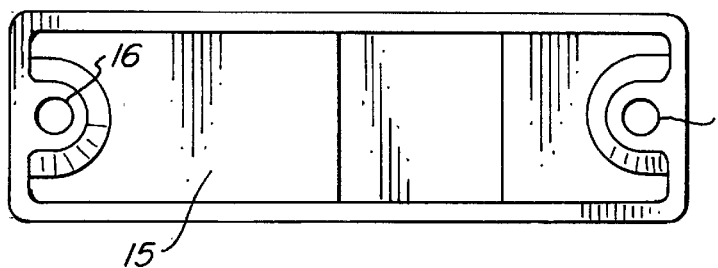
FIG. 6 is a top view of the bracket of FIG. 3.
Figure 3:
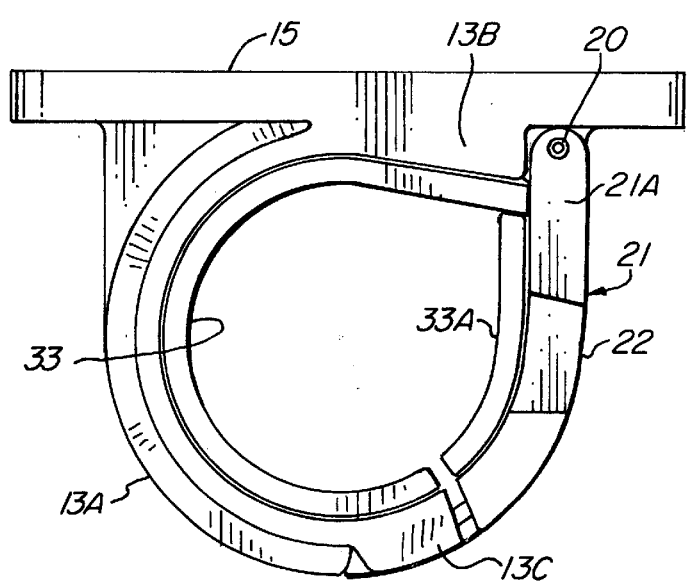
FIG. 3 is a side view of the bracket of FIG. 2 in the latched or closed position.

As evident in FIG. 1, the rod hanger 10 comprises at least a pair of brackets 13 and 14 disposed in spaced relationship. Each of the respective brackets 13 and 14 are generally similar in structure. Referring to FIGS. 1 to 3, each of the respective brackets 13 and 14 include a mounting plate 15—15 provided with opposed through holes 16 and 17 by which the respective mounting plates 15—15 can be secured to a supporting surface by means of suitable fasteners such as screws, bolts or nails 18, as seen in FIG. 1.

Mounted to or integrally connected on the mounting plate 15 is a generally C-shaped fixed portion 13 having opposed ends 13B and 13C to define an opening 19 therebetween, through which the opposed ends of a rod, e.g. a fishing rod 12, is received and/or removed from the respective brackets 13 and 14.

Figure 4:
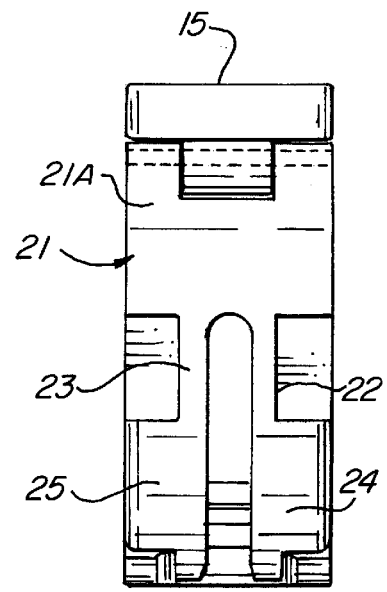
FIG. 4 is an end view of the bracket of FIG. 3.

Pivotally connected to the end 13A of the fixed portion 13A by hinge pin 20 is a latch 21. As best seen in FIG. 2, the latch 21 is generally arcuate in shape and pivotally mounted to swing relative to the fixed portion 13A to effect the opening and closing of the opening 19. Referring to FIGS. 1, 2 and FIGS. 3–5A, the latch 21 includes a bifurcated hinge portion 21A by which the latch 21 is hinged by pin 20 to the end 13B of the fixed portion 13A. Projecting outwardly, as viewed in FIG. 1, are a pair of flexible arms 22 and 23 as an extension of the hinge portion 21A. The respective arms 22, 23 are formed of a suitable material whereby the respective arms 22, 23 may be squeezed or compressed inwardly toward one another when a squeezing force F is applied to the respective arms 22, 23, as viewed in FIG. 8. The latch is formed of a suitable material having inherent elasticity whereby the respective arms 22, 23 will return to their normal outward position as seen in FIGS. 2 and 4, when the squeezing force F applied thereto is released.

To facilitate the squeezing of the respective arms 22, 23 toward one another, as will be hereinafter described, each of the respective arms 22, 23 is formed with an outwardly or laterally extending projecting portion 24, 25 to which a user may apply a squeezing force on the associated arm 22, 23. As shown, the projecting portions 24, 25 are located intermediate the hinged end 21A of the respective arms 24, 25 and the free end 22A, 23A thereof.

Between the respective projecting portions 24, 25 and the free end 22A, 23A of arms 22, 23, the respective arms 22, 23 are provided with a laterally, outwardly projecting flange 22B, 23B. As best seen in FIGS. 7 and 9–11, the free ends 22A, 23A of the respective arms 22, 23 are also provided with a catch 26, 27 in the form a detent extending normal to its associated arm 22, 23.

Figure 5:
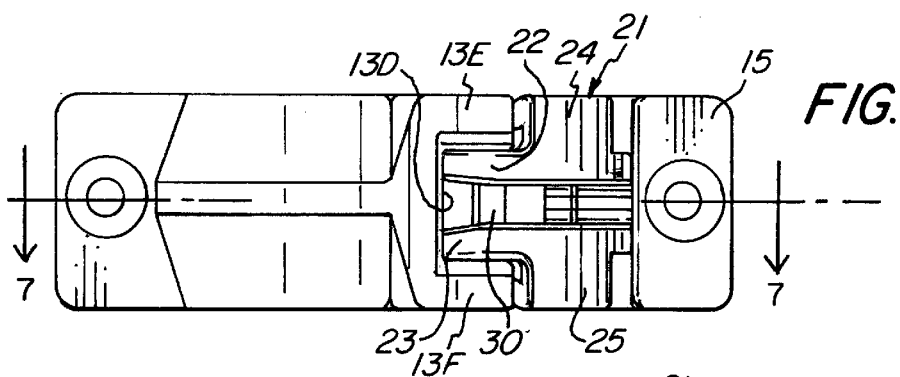
FIG. 5 is a bottom view of the bracket of FIG. 3.
Figure 5A:
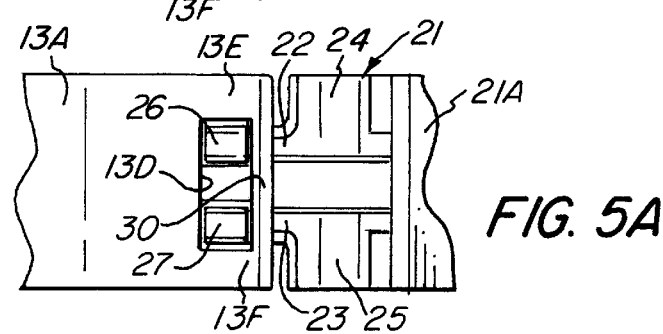
FIG. 5A is a portion of the bracket illustrating the latch from the opposite side of that illustrated in FIG. 5.

The end 13C of the fixed portion 13A is formed with a cutout portion 13D having opposed sides 13E and 13F, as best seen in FIGS. 9–10. Formed in each opposed sides 13E, 13F is a groove 28 to define guideways for receiving the flanges 22B, 23B of the respective arms 22, 23 in the latched position of the latch 21. The lower surface of the end portion 13B defines a transverse lip 30 adapted to engage the detents 26, 27 forming the catch, as best seen in FIG. 7 and FIG. 5A. FIG. 5A illustrates the underside of latch 21 without the resilient liner 33, illustrated in FIG. 3. The transverse lip 30 holds the catches 26 and 27 securely until the flexible arms 22 and 23 are squeezed together permitting the bifurcated hinge portion to pivot.

It is to be noted that each of the respective brackets 13 and 14 are similarly constructed except as hereinafter set forth. Therefore, each of the brackets 13 and 14 are similar in operation.

To effect the opening of the bracket 13 or 14 from its closed position as shown in FIG. 1, a squeezing force F is applied by the user onto the opposed projecting portions 24, 25 of the respective flexible arms 22, 23 to compress or squeeze the respective arms 22–23 inwardly toward one another, as noted in FIG. 8. As the arms 22 and 23 are squeezed, the lateral flanges 22B, 23B of the respective arms 22, 23 are disengaged from their respective grooves 28—28 (FIG. 11) so that the latch 21 is free to pivot toward the opening position as seen in FIGS. 2 and 7.

To effect the closure of the opening 19 of the respective brackets 13 and 14, the latch 21 is pivoted in the opposite direction. In closing the latch, it is not necessary to apply a squeezing force on the respective arms. Upon closing of the latch 21, the flanges 22B 23B engage a camming surface 13G, 13H formed on the opposed sides 13E, 13F of the cutout portion. In doing so, the respective arms 22, 23 are automatically cammed or squeezed inwardly to effect automatic latching and locking the latch 21 in the closed position. The arrangement is such that the latch is locked in place and is prohibited from any unintentional pivoting or rotating toward open position by catch detents 26, 27 engaging the transverse lip 30 and the engagement of flanges 22B, 23B within their respective grooves 28. Until a squeezing force F is applied to the respective arms 22, 23, as seen in FIGS. 8 and 11, the latch is incapable of being unintentionally unlatched. Thus, with the construction described, the respective brackets are positively retained in their respective latched or closed position until a squeezing force F is deliberately applied to the respective arms 22, 23.

In accordance with this invention, the respective brackets 13 and 14 may be provided with a protective liner to facilitate the storage of a fishing rod without causing damage thereto. As seen in FIG. 1, the proximal bracket 13, adapted to support the handle portion 12A of a fishing rod, may be provided with a resilient liner 33 secured to the inner surface of the fixed bracket portion 13A. A similar liner 33A is secured to the inner surface of the latch 13. The liner 33, 33A of bracket 13 may be comprised of a resilient band of rubber, sponge, foam or other forgiving substance to protect the handle portion of a fishing rod supported therein.

The complementary bracket 14 for supporting the other end of the fishing pole 12 may be defined as the distal bracket. As best seen in FIG. 1, the fixed portion of the distal bracket has secured to the inner surface thereof a resilient cushion 34 which, together with the cushion sector 34A connected to the interior surface of the latch, occupies substantially the entire interior area of the distal bracket, except for a small opening to accommodate the small end 12B of a fishing rod 12. As the end of the fishing rod supported therein is substantially smaller in diameter than the handle portion of the fishing rod, the cushion 34 and its complementary cushion segment 34A will function to align and positively support the end of the fishing rod securely with a minimum of play between the fishing rod and the bracket.

It will be understood that the respective brackets 13, 14 may be formed of any suitable material, e.g. plastic or metal, which can be suitably molded in the form illustrated in the drawings and/or as herein described. The bracket structure described provides for a positive latching arrangement so that the respective brackets are incapable of being unintentionally unlatched as may otherwise occur under conditions of excessive boat vibration and/or by high winds and rough seas. The bracket structure described herein can be unlatched only upon the application of a positive squeezing force F upon the resilient arms 21, 22 as herein described.

While the present invention has been described with respect to a particular embodiment, modifications and variations may be made without departing from the spirit and scope of this invention.

What is claimed is:

1. A rod holder comprising:

a pair of spaced apart brackets for supporting therebetween a rod;

each of said brackets including a generally C-shaped portion having opposed ends to define an opening therebetween;

a mounting plate connected to said C-shaped portion;

a complementary latch pivotally connected to one of said opposed ends for pivoting between an open and closed position and the other end of said opposed ends having a cutout portion with opposed sides;

each of said opposed sides of said cutout portion having a groove formed therein;

said latch having a pair of spaced apart elongated flexible arms having their respective free ends insertable into said cutout portion in the latched position; said flexible arms having an inherent resiliency for normally maintaining said free ends in a spaced apart position;

and each of said flexible arms having a laterally outwardly extending flange adjacent the free ends thereof;

said flanges being receivable in said grooves in the latched position;

means formed on said flexible arms for imparting a squeezing force thereto;

opposed cam surfaces on said opposed sides of said cutout portion for camming said flexible arms inwardly to render said latch self-locking in the latched position; and complementary means formed on said flexible arms and said cutout portion for positively locking said flexible arms within said cutout portion in the latched position of said latch whereby unintentional unlatching of said latch is prohibited, and wherein said complementary means comprise an elongated transverse slot in said other end extending at least a distance equal to a transverse distance of said flexible arms in said spaced apart position and defining a transverse lip connected between said opposed sides of said cutout portion; and a detent comprising a catch normal to said flexible arm connected to each of said free ends of said flexible arms for detachably engaging said transverse lip, whereby the inherent resiliency of said flexible arms maintains said detent positively engaged in locked position with said transverse lip until intentionally released by the application of a positive squeezing force on said squeezing means formed on said flexible arms.

2. A rod holder as defined in claim 1 wherein one of said brackets and corresponding latch includes a resilient liner connected to the inner surface thereof.

3. A rod holder as defined in claim 2 wherein the other of said bracket and its corresponding latch includes a resilient cushion connected to the inner surfaces thereof for occupying substantially the entire interior area of said other bracket except for a small opening for receiving and centering the small end of a fishing rod supported therein.

* * * * *